(12) United States Patent
Mitsuhashi et al.

(10) Patent No.: US 6,708,287 B1
(45) Date of Patent: Mar. 16, 2004

(54) ACTIVE/STANDBY DUAL APPARATUS AND HIGHWAY INTERFACE CIRCUIT FOR INTERFACING CLOCK FROM HIGHWAY

(75) Inventors: Kenji Mitsuhashi, Kawasaki (JP); Ryo Takajitsuko, Kawasaki (JP); Kiyohumi Mitsuze, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/572,195

(22) Filed: May 17, 2000

(30) Foreign Application Priority Data

Aug. 31, 1999 (JP) .......................................... 11-245641

(51) Int. Cl.⁷ ............................................... G06F 11/00
(52) U.S. Cl. ............................. 714/15; 714/11; 714/13; 713/400; 713/501
(58) Field of Search .............................. 714/15, 10, 11, 714/12; 713/400, 501; 709/400

(56) References Cited

U.S. PATENT DOCUMENTS

| | | | | |
|---|---|---|---|---|
| 3,757,302 A | * | 9/1973 | Pollitt | 714/22 |
| 5,155,729 A | * | 10/1992 | Rysko et al. | 714/11 |
| 5,274,678 A | * | 12/1993 | Ferolito et al. | 375/357 |
| 5,313,386 A | * | 5/1994 | Cook et al. | 700/82 |
| 5,621,884 A | * | 4/1997 | Beshears et al. | 714/10 |
| 5,758,132 A | * | 5/1998 | Str.ang.hlin | 713/501 |
| 5,764,882 A | * | 6/1998 | Shingo | 714/11 |
| 5,777,874 A | * | 7/1998 | Flood et al. | 700/82 |
| 5,790,609 A | * | 8/1998 | Swoboda | 375/357 |
| 5,796,937 A | * | 8/1998 | Kizuka | 714/13 |
| 5,852,728 A | * | 12/1998 | Matsuda et al. | 713/501 |
| 5,901,281 A | * | 5/1999 | Miyao et al. | 714/11 |
| 5,958,069 A | * | 9/1999 | Kawasaki et al. | 714/11 |

FOREIGN PATENT DOCUMENTS

| | | | | |
|---|---|---|---|---|
| EP | 742507 A1 | * | 11/1996 | G05D/1/00 |
| JP | 63299438 | | 12/1988 | |
| JP | 10011310 | | 1/1998 | |

* cited by examiner

Primary Examiner—Robert Beausoliel
Assistant Examiner—Yolanda L Wilson
(74) Attorney, Agent, or Firm—Katten Muchin Zavis Rosenman

(57) ABSTRACT

A dual apparatus having a first unit and a second unit of a same configuration, one being operated in an active state while the other in a standby state. Each of these first and second units comprises a first selector for setting a current unit to the active state if a predetermined fault occurs in the other unit; a second selector for sending information indicative of the setting of the current unit to the active state, if a predetermined fault occurs in the other unit and the first selector selects a first act state, to the other unit and, setting the current unit to the standby state, if the predetermined fault does not take place in the other unit and the first selector selects the active state and a state indicated by information supplied from the other unit is the active state; and a register for holding one of the active and standby states selected by the second selector.

11 Claims, 17 Drawing Sheets

FIG. 8

| NOP FAUL OF OTHER SYSTEM | PAL FAUL OF OTHER SYSTEM | PDX FAUL OF OTHER SYSTEM | PLS FAUL OF OTHER SYSTEM | ACT MASK |
|---|---|---|---|---|
| FAULT ("0") | — | — | — | "0" |
| — | FAULT ("0") | — | — | "0" |
| — | — | FAULT ("0") | — | "0" |
| — | — | — | FAULT ("0") | "0" |
| NORMAL ("1") | NORMAL ("1") | NORMAL ("1") | NORMAL ("1") | "1" |

FIG. 9

| XOACT1 | ACTMASK | XACTCMI | XOACT2 | XACTCMO |
|---|---|---|---|---|
| SBY("1") | OTHER SYSTEM FAULTY("0") | ACT("0") | ACT("0") | ACT("0") |
| ACT("0") | OTHER SYSTEM FAULTY("0") | ACT("0") | ACT("0") | ACT("0") |
| ACT("0") | OTHER SYSTEM FAULTY("0") | SBY("1") | ACT("0") | ACT("0") |
| SBY("1") | OTHER SYSTEM FAULTY("0") | SBY("1") | ACT("0") | ACT("0") |
| ACT("0") | OTHER SYSTEM NORMAL("1") | ACT("0") | OLD STATE HELD | ACT("0") |
| SBY("1") | OTHER SYSTEM NORMAL("1") | ACT("0") | SBY("1") | SBY("1") |
| ACT("0") | OTHER SYSTEM NORMAL("1") | SBY("1") | ACT("0") | ACT("0") |
| SBY("1") | OTHER SYSTEM NORMAL("1") | SBY("1") | OLD STATE HELD | SBY("1") |

FIG. 10

| XOACT2 | XIACT | ACTMASK | XOACT |
|---|---|---|---|
| ACT("0") | ACT("0") | OTHER SYSTEM FAULTY("0") | ACT("0") |
| ACT("0") | ACT("0") | OTHER SYSTEM NORMAL("1") | SBY("1") |
| ACT("0") | SBY("1") | — | ACT("0") |
| SBY("1") | ACT("0") | — | SBY("1") |

ACTIVE/STANDBY DUAL APPARATUS AND HIGHWAY INTERFACE CIRCUIT FOR INTERFACING CLOCK FROM HIGHWAY

BACKGROUND OF THE INVENTION

1. Field of the Invention

The present invention relates generally to a dual apparatus having two systems which operate in active (ACT) state and standby (SBY) state respectively. Especially, the present invention relates to the switching between the systems of the dual apparatus and to clock control therefor.

2. Description of Related Art

A switching system for example has a dual system configuration in which two equally configured systems, system 0 and system 1 for example, operate to ensure continued service provision if a fault is encountered. In such a dual system, one system operates in active mode while the other in standby mode. A switching system based on such a dual configuration comprises a CPR (Call PRocessor), a PSA (Processor Access Controller (PAC) and System Bus Arbiter), LRPCS (Line/Register signal and Path Controller for Small switch), TSW (Time SWitch), TNG (ToNe Generator), HWINF (HighWay INterFace), SGC (SiGnaling Controller), LTC (Line Trunk Common), DT (Digital Terminal), and SAMSH (Synchronization and Alarm Maintenance SHelf), each being arranged for each of the two systems. A dual apparatus based on system 0 and system 1 may be configured such that a single device constitutes the ACT/SBY system as with the CPR or plural units like LRPCS, TSW, and HW for example constitute one ACT/SBY system. Continued service provision requires switching between the ACT system and the SBY system when a fault is detected or maintenance is made in the ACT system in the above-mentioned configuration unit of the ACT/SBY system.

Control for switching between the ACT and SBY systems is made such that one (LRPCS for example) of the dual devices constituting each ACT/SBY system sends an ACT/SBY specification signal and an ACT/SBY select result signal to the other system through a confounding line connected to a dual device (LRPCS for example) of the other system to check the state of the other system, thereby preventing both the systems from becoming the ACT system or the SBY system at the same time. The ACT/SBY specification signal indicates the active state or the standby state specified by an upper unit such as a CPR or specified externally. The ACT/SBY select result signal transmits the ACT/SBY selection result of the dual apparatus to the other system by considering the specification signals of the current system and the other system, the current ACT/SBY state of the dual apparatus, and the fault occurrence status of the other system. For example, if the power supply of the system 0 of the dual apparatus fails when the system 0 is active and the system 1 is standby, then the system 1 detects the fault of the system 0 and, in order to shift to the active state, sets the ACT/SBY select result signal to the active state, and sends this signal to the system 0. The system 0, which is active, informs the system 1 that the ACT/SBY select result signal is active. The system 1, because the selection results of the system 0 and the system 1 are active, maintains the standby state so far set. If the system 0 cannot drive the ACT select result signal due to power failure, the system 1 selects the active state and shifts to the active state.

On the other hand, the SGC receives a clock indicative of an 8-KHz frame, a specification signal indicative of one of ACT and SBY states, and a control signal for controlling call origination and termination from the dual LRPCS through the TSW. By use of the highway interface circuit, the SGC separates the clock and specification signal supplied from the system-0 and system-1 LRPCSs from the predetermined highway time slots. The SGC, in phase-synchronization with the 8-KHz clock of the ACT system specified by the specification signal through the PLO (Phase-Locked Oscillator) installed on the highway interface circuit, supplies the 32-MHz clock and the 8-KHz clock obtained by dividing the 32-MHz clock to other internal circuits as operating clocks. The other internal circuits of the SGC execute HDLC data transfer and LAPD communication in synchronization with the 32-MHz and 8-KHz operating clocks supplied from the PLO.

However, the above-mentioned related-art dual apparatus involves the following problems:

(1) Conventionally, if the power supply for supplying power to the LRPCS and other units fails, the ACT specification of the failing side is maintained until the ACT/SBY select signal cannot be driven due to the lowered voltage of the failing LRPCS. Therefore, ACT-system switching is made when the failing system circuit operates no more. At this point of time, because the circuit does not operate normally, the transmission of signals such as clocks to the lower units such as the SGC is discontinued. Consequently, service provision is discontinued on the lower units. If the voltage level on the ACT side lowers temporarily for some reason, putting that device out of its operation guaranteed range, that device may not operate normally, failing to send normal signals to the lower units. In such a situation, no system switching is executed.

(2) The SGC for example receives a highway frame-mapped specification signal indicative of ACT or SBY state supplied from an upper unit such as the LRPCS and generates, through the PLO, as an operating clock, a clock (32 MHz) synchronized with the reference clock mapped into the highway frame time slot of the ACT system indicated by the specification signal. However, if the ACT-system clock fails, deviating the period of the reference clock or stopping the reference clock, the PLO gets out of synchronization with the reference clock, interrupting communication during that period.

In addition, if the ACT-system fault is immediately detected by the LRPCS, causing ACT/SBY system switching, the PLO outputs an out-of-synchronization alarm because the specification signal is supplied through the highway time slot and, depending on the system switching timing, if the specification signal is supplied immediately before fault occurs, the system switching is notified through the time slot of the next frame, thereby delaying system switching recognition. Once out-of-synchronization occurs, it takes a certain time to restore synchronization. If this time is long, the LAPD communication link may not be maintained, failing continued service provision. Further, it is also a problem that an out-of-synchronization alarm issued when the lower unit itself is not failing causes system-switching fault processing. Prevention of such a problem requires the measures for preventing the alarm from being issued by the lower unit for the fault of the upper unit.

SUMMARY OF THE INVENTION

It is therefore an object of the present invention to provide a dual apparatus for quickly executing system switching without adversely affecting lower units when a fault occurs in the ACT system.

It is another object of the present invention to provide a highway interface circuit that does not cause out-of-synchronization even if clock fault occurs.

In accordance with an aspect of the present invention, there is provided a dual apparatus having a first unit and a second unit of a same configuration, one being operated in an active state while the other in a standby state. Each of these first and second units comprises a first selector for setting a current unit to a first active state if a predetermined fault occurs in the other unit; a second selector for setting the current unit to the active state if a predetermined fault occurs in the other unit and the first selector selects the first active unit, and sending information indicative thereof to the other unit and, setting the current unit to the standby state if the predetermined fault does not take place in the other unit and the first selector selects the active state and a state indicated by information supplied from the other unit is the active state, and sending information indicative thereof to the other unit; and a register for holding one of the active and standby states selected by the second selector.

In accordance with another aspect of the present invention, there is provided a highway interface circuit for generating a first clock on the basis of a reference clock supplied from a highway, comprising: a selector for selecting one of the reference clock and a free-running clock on the basis of a switch signal to output a second clock; a phase-locked oscillator, synchronized with the second clock, for generating the first clock having a frequency which is an integral multiple of a frequency of the second clock; a free-running clock generator, reset on the basis of the switch signal and the reference clock, for executing a counting operation on the basis of the first clock to generate the free-running clock having a same frequency as that of the reference clock; and a reference clock monitor for executing a counting operation on the basis of the first clock to generate the switch signal indicative of abnormalcy in the reference clock.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which:

FIG. 8 is a truth table for an ACT/SBY mask circuit shown in FIG. 6;

FIG. 9 is a truth table for a first ACT/SBY selector shown in FIG. 6;

FIG. 10 is a truth table for a second ACT/SBY selector shown in FIG. 6;

DETAILED DESCRIPTION OF THE PREFERRED EMBODIMENTS

This invention will be described in further detail by way of example with reference to the accompanying drawings. Before going into the details of embodiments of the invention, the following describes principles of operation of the present invention. Now, referring to FIG. 1, a dual apparatus has a first unit 1#0 and a second unit 1#1. The first and second units 1#i (i=0, 1) each have a first signal line 2#i, a second signal line 3#i, a third signal line 4#i, a first selector 5#i, a second selector 6#i, and a register 7#i. A specification signal is inputted in the first signal line 2#i from upper equipment, the signal being indicative of which of active state and standby state the system is in. Predetermined fault information about a fault detected in the other unit is inputted in the second signal line 3#i. The third signal line 4#i outputs signals to the other unit 1#j (j≠i). The first selector 5#i selects the first active state and the first standby state according to the specification signal and the fault information. If the fault information inputted in the second signal line 3#i indicates a fault detected in the other unit 1#j, the first selector 5#i selects the first active state for the current unit 1#i. If a signal inputted from the third signal line 4#j of the other unit 1#j indicates an active state and the state selected by the first selector 5#i is the first active state and the fault information indicates a fault of the other unit 1#j, the second selector 6#i selects an active state for the current unit 1#i and outputs the selected state to the third signal line 4#i. If the signal inputted from the third signal line 4#j indicates an active state and the state selected by the first selector 5#i is an active state and the fault information does not indicate a fault of the other unit, the second selector 6#i selects a standby state for the current unit and outputs the selected state to the third signal line 4#i. The register 7#i holds the state selected by the second selector 6#i.

Figure 1:
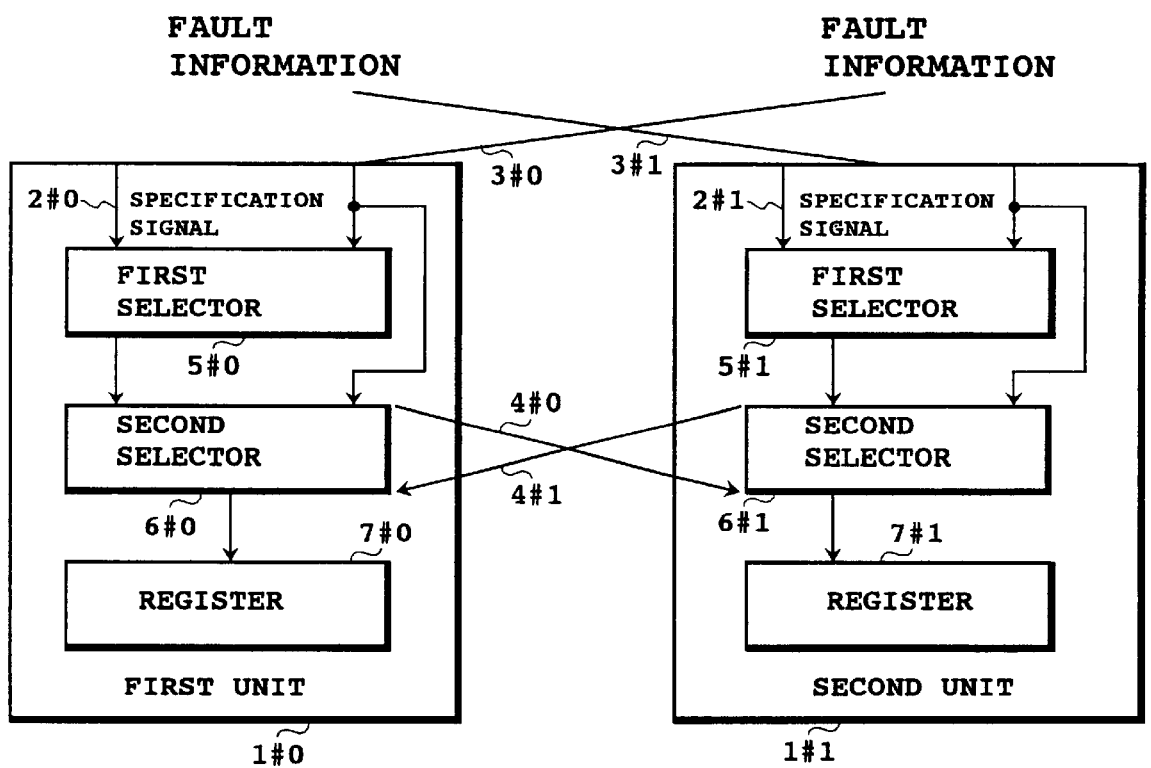
FIG. 1 is a schematic diagram illustrating the principles of operation of the invention.

The following describes the operation of the configuration shown in FIG. 1. In the initial state of the first and second units 1#i, a specification signal is inputted from upper equipment or an external system through the second signal line 3#i in order to set the current unit to the active or standby state. The first selector 5#i selects the first active state or the first standby state and, if the fault information inputted in the second signal line 3#i indicates a fault in the other unit 1#j, selects the first active state for the current unit. If the signal inputted from the third signal line 4#j of the other unit 1#j indicates an active state and the state selected by the first selector 5#i is the first active state and the fault information indicates a fault in the other unit 1#j, the second selector 6#i selects an active state for the current unit 1#i. If the signal inputted from the third signal line 4#j indicates an active state and the state selected by the first selector 5#i is the active state and the fault information does not indicate a fault in the other unit 1#j, the second selector 6#i selects the standby state for the current unit 1#i. Then, the second selector 6#i outputs the selected state to the third signal line 4#i. Consequently, if a fault occurs in the unit 1#i in the active state, the unit 1#i is switched to the standby state and the unit 1#j in the standby state is switched to the active state instantly. Thus, the uninterrupted service provision is secured.

Figure 2:
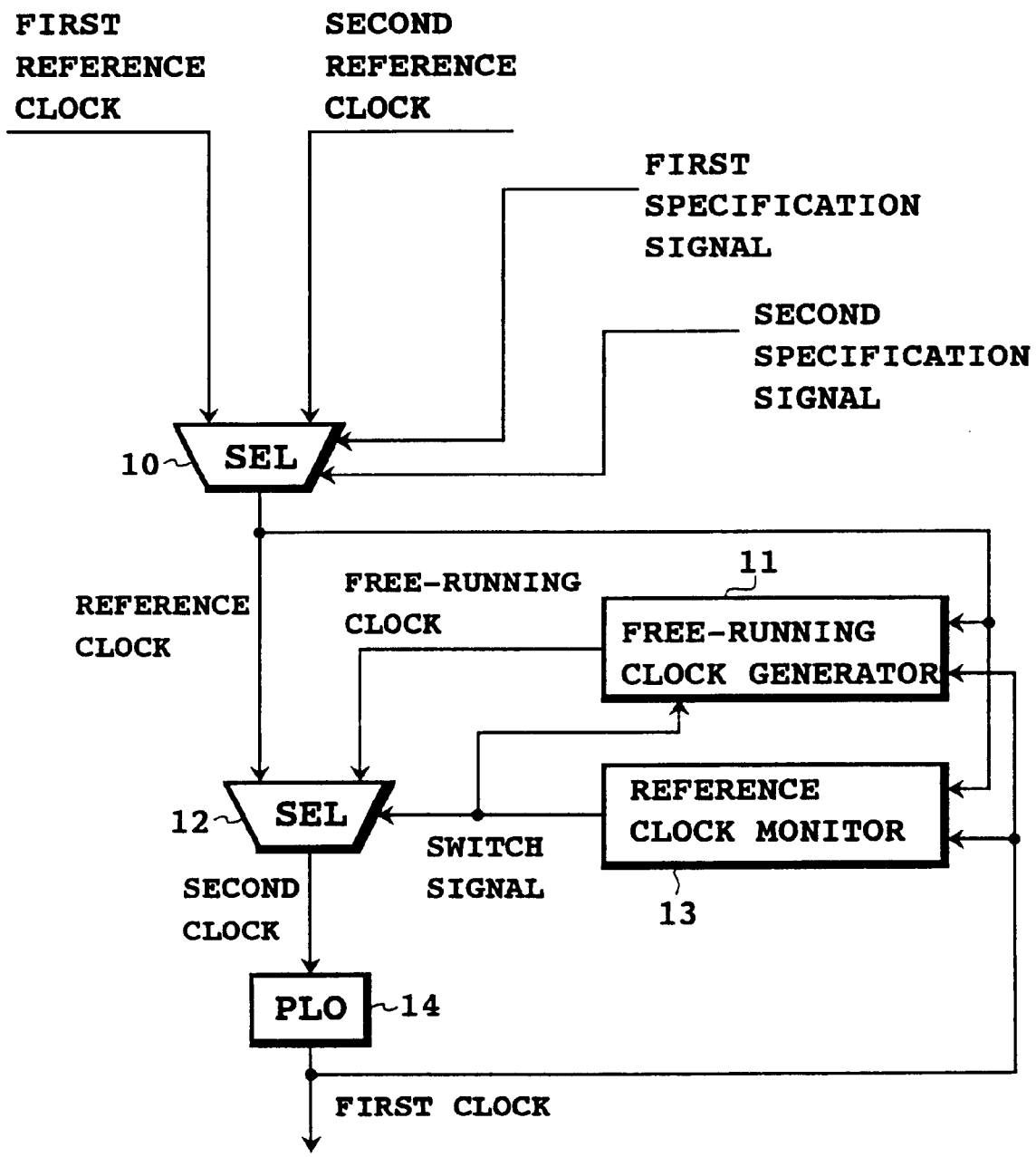
FIG. 2 is another schematic diagram illustrating principles of operation of the invention.

Referring to FIG. 2, a highway interface circuit has a first selector 10, a free-running clock generator 11, a second selector 12, a reference clock monitor 13, and a PLO (Phase-Locked Oscillator) 14. The first selector 10 selects from the first and second reference clocks the clock indicative of an active state as the reference clock on the basis of the first and second specification signals. The second selector 12 selects the reference clock or a free-running clock on the basis of a switch signal and outputs a second clock. The PLO 14 generates a first clock which is synchronized with the second clock and has a frequency which is an integral multiple of the frequency of the second clock. The free-running clock generator 11 is reset on the basis of the switch signal and the reference clock and, on the basis of the first clock, performs a counting operation to generate a free-running clock having the same frequency as the reference clock. The reference clock monitor 13 performs a counting operation on the basis of the first clock to check the reference clock for abnormalcy and generates a switch signal indicative of presence or absence of the abnormalcy.

The following describes the operation of the configuration shown in FIG. 2. The first and second specification signals are mapped from first and second highways respectively into a predetermined time slot to be inputted. The first and second reference clocks are mapped from third and fourth highways respectively into a predetermined second time slot to be supplied. The first selector 10 selects a clock in active state as the reference clock according to the first and second specification signals. The second selector 12 selects the reference clock or the free-running clock according to the switch signal and outputs the second signal. The PLO 14 generates the first clock synchronized with the second clock and having a frequency which is an integral multiple of the frequency of the second clock. The reference clock monitor 13 performs a counting operation on the basis of the first clock to check the reference clock for abnormalcy in period and for discontinuation, outputting a decision signal indicative of a fault as a switch signal. According to this switch signal, the free-running clock generator 11 is reset if the reference clock is normal and performs a counting operation to generate a free-running clock that matches the phase of the reference clock. If the reference clock is found abnormal, the free-running clock generator is not reset but, when the count made according to the first clock has reached a predetermined value, clocks the pulse in free-running manner to output the clocked pulse, and is reset according to this pulse. Consequently, if the reference clock goes abnormal, the free-running clock is outputted in a normal period. The second selector 12 selects the free-running clock if the switch signal indicates that the reference clock is abnormal. The PLO 14 is synchronized with the second clock in phase. Consequently, if the reference clock goes abnormal, the PLO 14 will not get out of synchronization.

Figure 3:
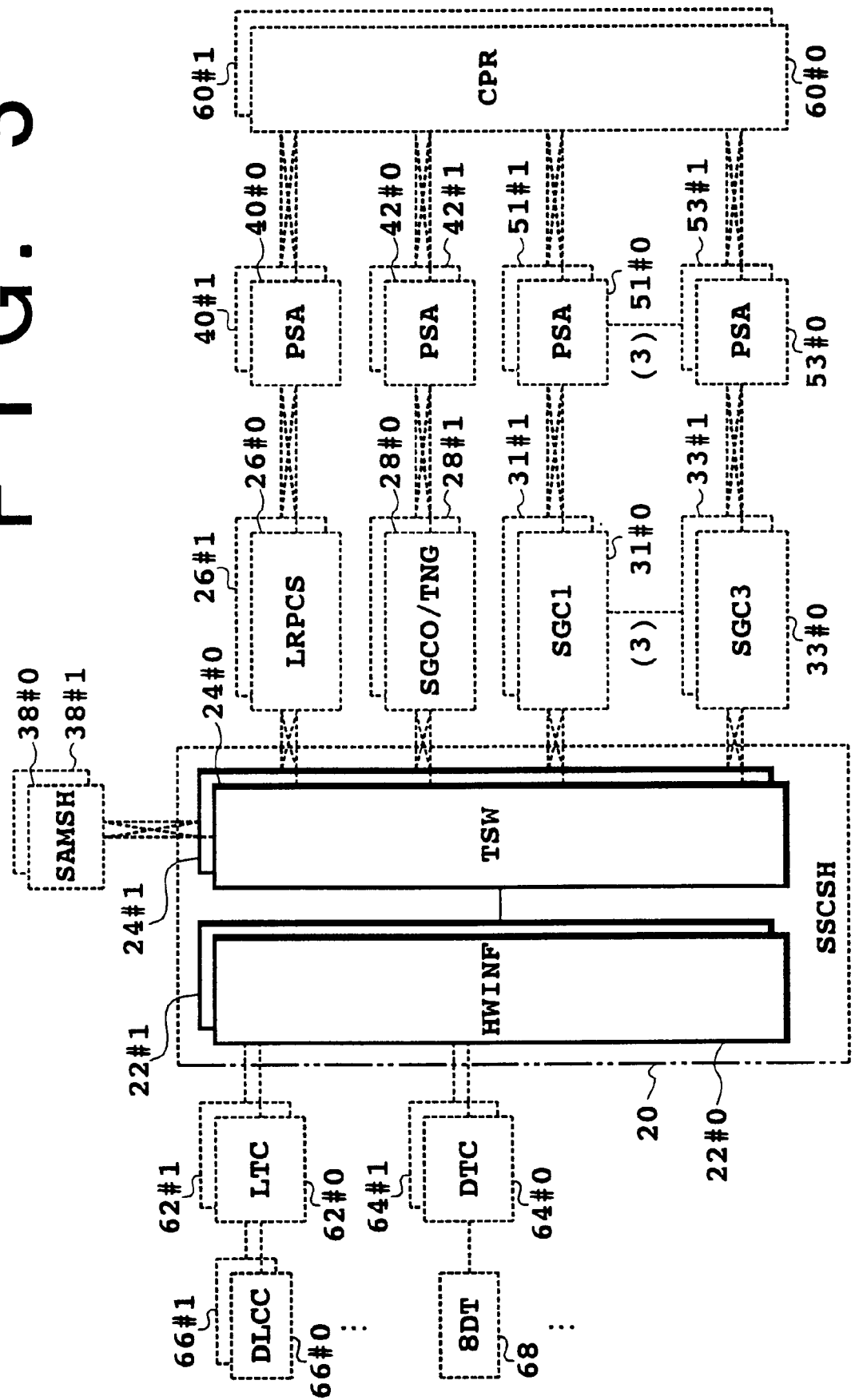
FIG. 3 is a schematic diagram illustrating a configuration of a switching system practiced as one preferred embodiment of the invention.

Referring to FIG. 3, an exchange system to which the present invention is applied comprises an SSCSH 20 having HWINFs 22#0 and 22#1, TSWs 24#0 and 24#1, LRPCSs 26#0 and 26#1, TNGs 28#0 and 28#1, and SGCs 31#0, 31#1, 32#0, 32#1, 33#0, 33#1. The exchange system further comprises SAMSHs 36#0 and 36#1, PSAs 40#0, 40#1, 42#0, 42#1, 51#0, 51#1, 52#0, 52#1, 53#0, and 53#1, CPRs 60#0 and 60#1, LTCs 62#0 and 62#1, DTCs 64#0 and 64#1, DLCCs 66#0 and 66#1, and an 8DT 68. It should be noted that notation "#i" (i=0, 1) denotes system 0 and system 1. CPR 60#i (i=0, 1) of dual configuration executes call processing and, at the same time, fault control to control ACT/SBY switching of lower equipment. In addition, the CPR 60#i controls buses providing connection between the PSAs 40#i to 53#i (i=0 to 2), the CPRs 60#0 and 60#1, and the LRPCSs 26#0 and 26#i. The SAMSH 38#i (i=0, 1) distributes externally supplied frame pulse (8 KHz) and clock (2 MHz) to the LRPCS 26#i (i=0, 1) and the HWINF 22#i through the TSWs 24#0 and 24#1.

The LTC 62#i (i=0, 1) provides interface between the DLCC 66#i (i=0, 1) for accommodating an ISDN terminal, a DLC, not shown, for accommodating digital telephone, an SLC, not shown, for accommodating analog telephone, and the HWINF 22#i (i=0, 1). The DLCC 66#i (i=0, 1) accommodates the ISDN terminal and, at the same time, communicates ISDN messages with the SGC 31#i through 33#i (i=0, 1) by use of local LAPD communication. The DTC 64#i (i=0, 1) provides interface between the 8DT 68 for accommodating PBX and other exchanges and the HWINF 22#i. The 8DT 68 accommodates PBX and other exchanges.

Figure 4:
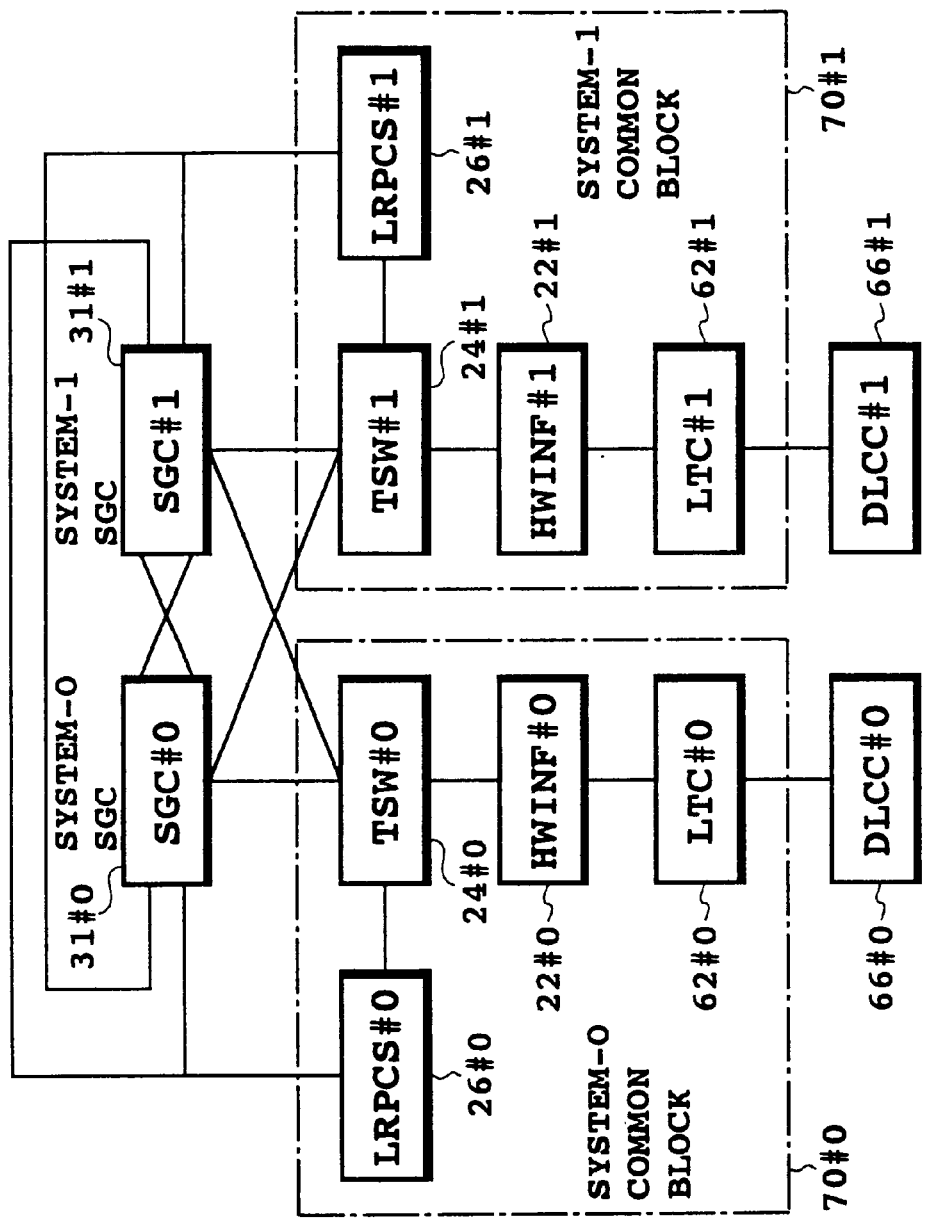
FIG. 4 is a schematic diagram illustrating a relationship between system 0 and system 1 in an SSCSH shown in FIG. 3.

Referring to FIG. 4, there is shown a relationship between the system 0 and the system 1 in the SSCSH 20 shown in FIG. 3. As shown, the SSCSH 20 comprises i-system common section 70#i (i=0, 1), 0-system SCG 31#i (i=0, 1), TNG 28#i (i=0, 1), SCG 32#i (i=0, 1), and SCG 33#i (i=0, 1). The i-common section 70#i (i=0, 1) comprises LRPCS 26#i, TSW 24#0, HWINF 22#i, and LTC 62#i and is operated with one side in active state and the other in standby state.

First Preferred Embodiment

Figure 5:
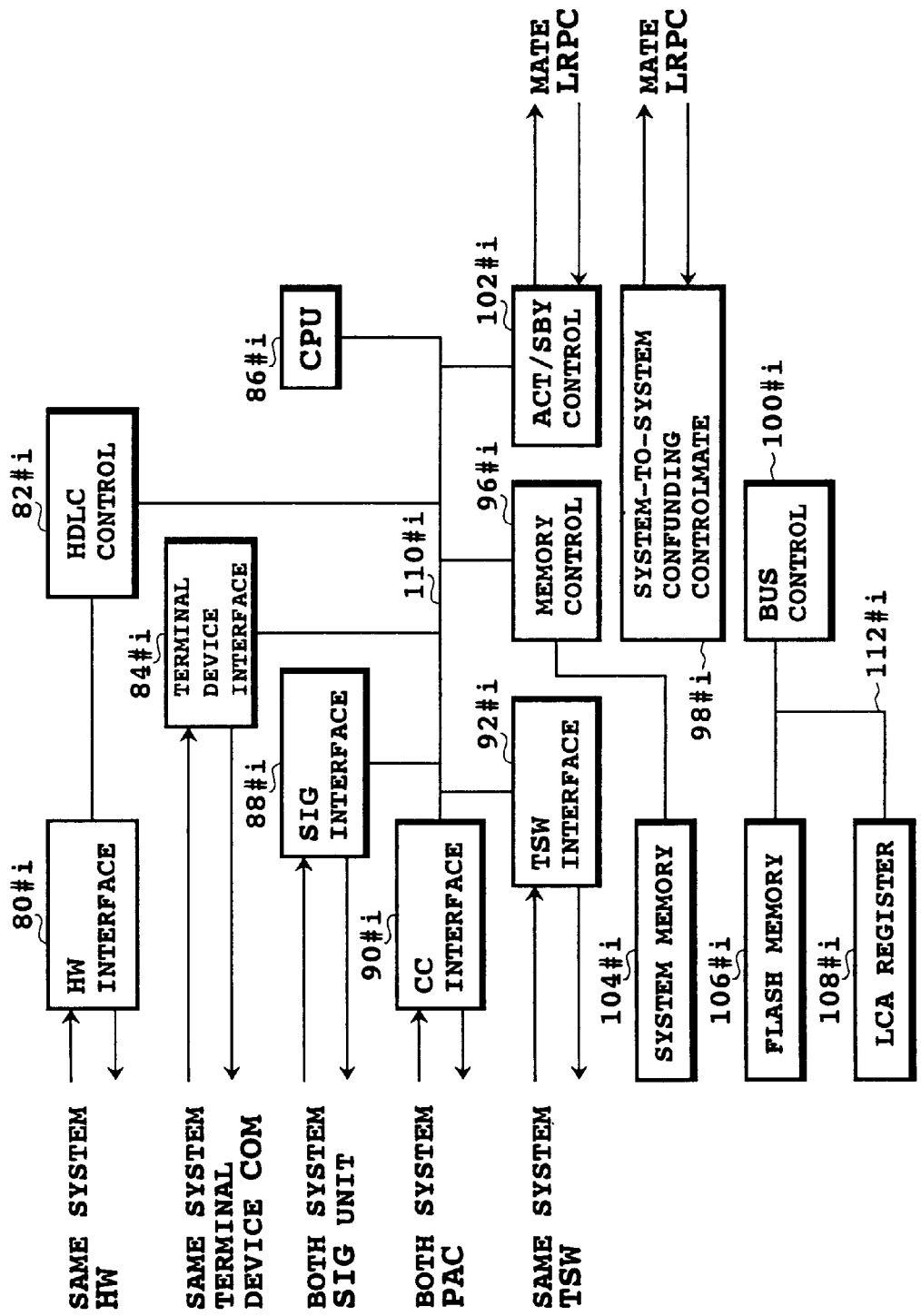
FIG. 5 is a block diagram illustrating an LRPCS according to a first preferred embodiment of the invention.

Referring to FIG. 5, there is shown a functional block diagram of the LRPCS practiced as a first preferred embodiment of the invention. As shown, the LRPCS 26#i comprises HW interface 80#i, HDLC control 82#i, terminal device interface 84#i, CPU 86#i, SIG interface 88#i, CC interface 90#i, TSW interface 92#i, memory control 96#i, system-to-system confounding control 98#i, bus control 100#i, ACT/SBY control 102#i, system memory 104#i, flash memory 106#i, LCA register 108#i, CPU bus 110#i, and slow bus 112#i. The HW interface 80#i provides interface with the highway, sends and receives HDLC data, and provides interface with highway control data. The HDLC control 82#i resolves HDLC received from the HW interface 80#i and develops the resolved HDLC into the system memory 104#i. The terminal device interface 84#i transfers data with a subscriber-accommodating terminal device and performs subscriber pulse counting. The CPU 86#i controls the entire LRPCS 26#i, the firmware executing the following functions for example associated with ACT/SBY switching:

(1) According to the command by the CPRs 60#0 and 60#1 at system initialization, the firmware writes a first signal indicative whether the current system is active or standby to ACT/SBY setting register 111#i in the LCA register 108#i and, at the same time, writes a signal for selecting the first signal to ACT select register 109#i in the LCA register 108#i.

(2) According to the command by the CPRs 60#0 and 60#1 upon non-emergent fault detected during system operation, the firmware writes a second signal for directing ACT/SBY switching to ACT/SBY specification register 113#i in the LCA register 108#i and, at the same time, writes a signal for selecting the second signal to the ACT select register 109#i in the LCA register 108#i.

(3) According to the contents of ACT/SBY instruction register 115#i, the ACT/SBY setting register 111#i, and the ACT/SBY specification register 113#i in the LCA register 108#i storing an ACT/SBY select signal XOACT selected by the ACT/SBY control 102#i for controlling ACT/SBY switching autonomously by hardware to be described later, the firmware executes ACT/SBY setting and switching.

The autonomous hardware control of ACT/SBY switching is executed when a fault occurs in the other system of the ACT system, requiring emergent ACT/SBY switching. Failures of this type include NOP fault in which the supply voltage of the other system for supplying power to the common block 70#i has lowered below a predetermined threshold or the power supply has been discontinued, PAL fault in which a fuse of the other system has blown, PDX fault in which the secondary power supply of the other system has failed, and PLS fault in which a package of the other system has been pulled out. It should be noted that the logic levels of the above-mentioned first and second signals for specifying ACT and SBY may be set as desired. In the present example, logic "0" specifies ACT and logic "1" specifies SBY. The SIG interface 88#i sends a control signal for call origination and termination control to its subordinate units, namely the TNG 28#i (i=0, 1) and the SGCs 31#i through 33#i (i=0, 1). The CC interface 90#i executes communication control under the control of the CPRs 60#0 and 60#1 and has the capability of data transfer between the PAC interface of the PSAs 40#0 and 40#i and the CPU bus 100#i.

The TSW interface 92#i has the following capabilities:

(1) According to the command by the CRPs 60#0 and 60#1 of the ACT system at call origination and termination, the TSW interface sets paths between the time slots of the input and output highways of the TSW 24#i.

(2) The TSW interface collects fault information outputted from the TSW 24#i to the accommodated highway and writes the collected information to system memory 104#i through the memory control 94#i. It should be noted that this fault information is sent to the CPRs 60#0 and 60#1 through the CC interface 90#i for the control of ACT/SBY switching.

(3) The TSW interface generates a clock synchronized with the clock outputted from the SAMSHs 38#0 and 38#1 of the ACT system through the TSW 24#i by use of the PLO (Phase-Locked Oscillator) and maps the generated clock onto highway time slots for distribution to the SGCs 31#0 and so on through the TSW 24#i.

The memory control 96#i interfaces the CPU 86#i to control the system memory 104#i, the local bus 112#i, and the flash memory 106#i. The system-to-system confounding control 98#i executes dual control, copying the content of the system memory 104#j of the LRPCS 26#j of the ACT system and executing system-to-system communication with the LRPCS 26#j of the other system. The bus control 100#i executes bus arbitration on each of the blocks that use the CPU bus 110#i. System memory 170#i is an SDRAM for storing various pieces of control information. The LCA register 108#i has the above-mentioned ACT select register 109#i, ACT setting register 111#i, ACT/SBY specification register 113#i, and ACT/SBY instruction register 115#i. The ACT/SBY control 102#i determines autonomously by hardware the ACT side and the SBY side of the common blocks 70#0 and 70#1 of the system 0 and 1 having dual redundancy configuration and writes the ACT/SBY select signal XOACT to the ACT/SBY instruction register 115#i. A power supply package not shown generates primary and secondary powers and supplies the supply voltages of the generated powers to the common block 70#i and, at the same time, compares the supply voltages of the generated powers with a predetermined threshold, thereby monitoring the primary and secondary power supplies. If the primary power supply fails, NOP fault ("0") is sent to the other system. If the secondary power supply fails, PDX fault ("0") is sent to the other system.

Figure 6:
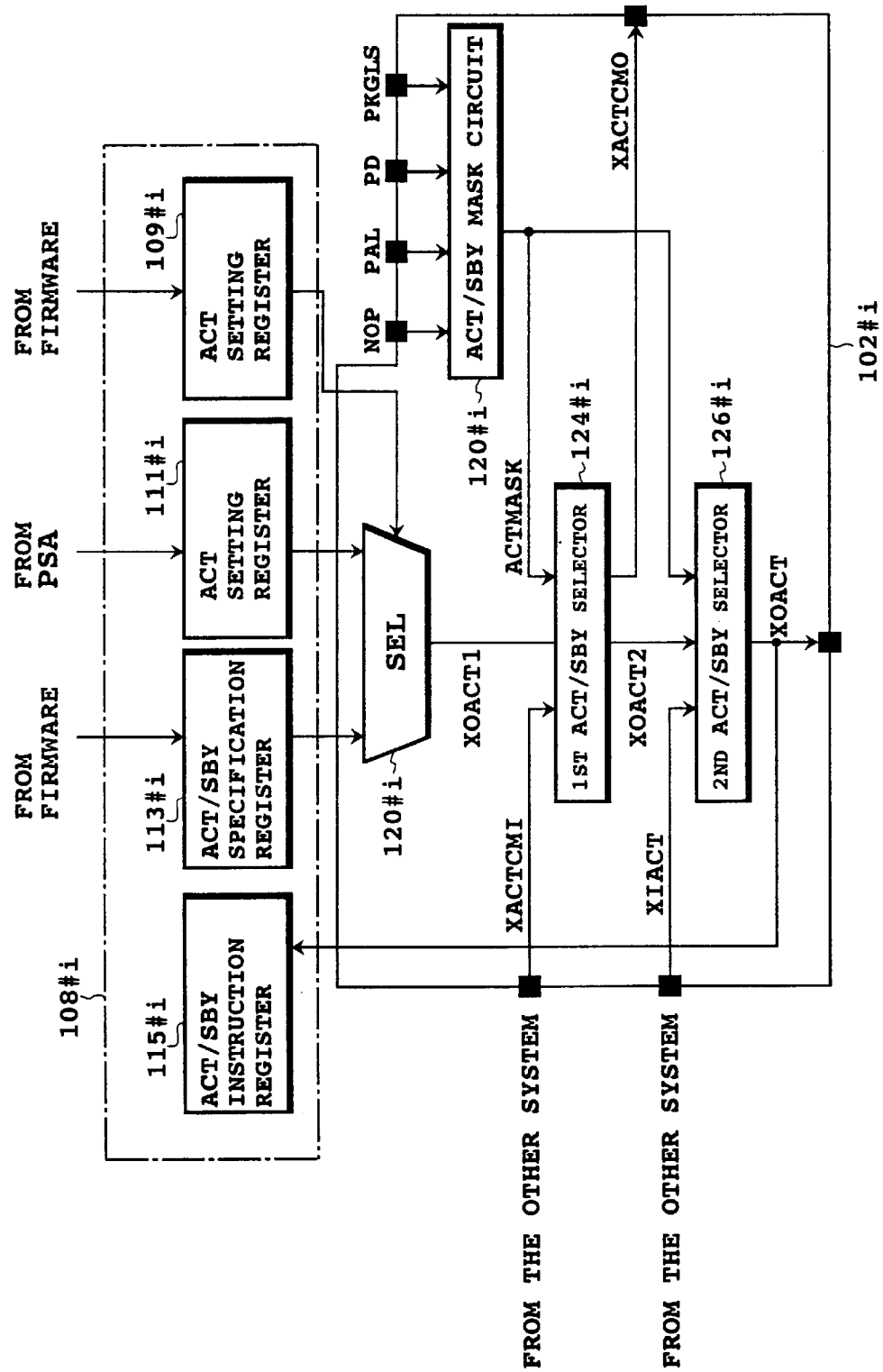
FIG. 6 is a block diagram illustrating an ACT/SBY control shown in FIG. 5.

Referring to FIG. 6, there is shown the configuration of the ACT/SBY control 102#i according to the first preferred embodiment of the invention. As shown, the ACT/SBY control 102#i has SEL 120#i, ACT/SBY mask circuit 124#i, first ACT/SBY selector 124#i, and second ACT/SBY selector 126#i.

Figure 7:
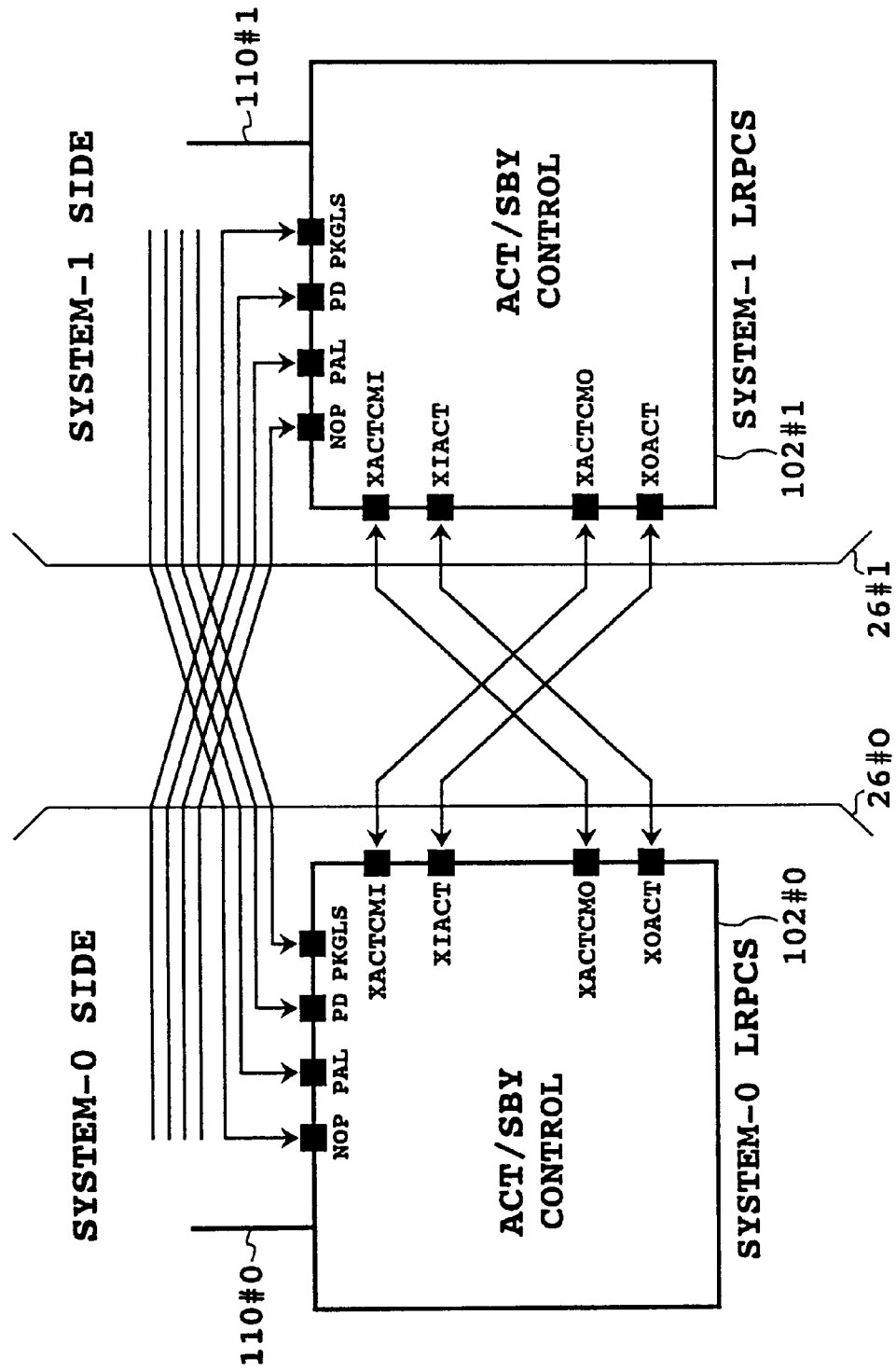
FIG. 7 is a diagram illustrating connections between a system-0 ACT/SBY control and a system-1 ACT/SBY control.

Referring to FIG. 7, there is shown a relationship in connection between the ACT/SBY control 102#0 of the system 0 and the ACT/SBY control 102#1 of the system 1. As shown, NOP fault, PAL fault, PD fault, and PKGLS fault are inputted from the common block 70#j (j≠i) of j-system into the ACT/SBY control 102#i of i-system at terminals NOP, PAL, PD, and PKGLS respectively. Input terminal XACTCMI of the current system is connected to output terminal XACTCMO of the other system, input terminal XIACT of the current system to XOACT of the other system, output terminal XACTCMO of the current system to input terminal XACTCMI of the other system, and output terminal XOACT of the current system to input terminal XIACT of the other system. The SEL 120#i shown in FIG. 6 selects the ACT/SBY setting register 111#i or the ACT/SBY specification register 113#i according to the select signal of the ACT select register 109#i and outputs signal XOACT1.

Referring to FIG. 8, there is shown a truth table for the ACT/SBY mask circuit 124#i. As shown, if any of NOP, PAL, PDX, and PLS faults to be inputted in the terminals NOP, PAL, PDX, and PLS respectively occurs, the ACT/SBY mask circuit 124#i sets signal ACTMASK indicative thereof to "0"; if none of these faults occurs, this mask circuit sets this signal to "1".

Referring to FIG. 9, there is shown a truth table for the first ACT/SBY selector 124#i. The ACT/SBY selector is a combination circuit in which signal XOACT1, signal ACTMASK, and specification signal XACTCMI are inputted and outputs signal XOACT2 and ACT/SBY specification signal XACTCMI according to the truth table shown in FIG. 9. For example, if the signal ACTMASK=fault in other system ("0"), the selector 124#i outputs the ACT/SBY specification signal XACTCMO=ACT ("0") and the signal XOACT2=ACT select ("0") unconditionally.

Referring to FIG. 10, there is shown a truth table for second ACT/SBY selector 127#i. As shown, the second ACT/SBY selector 127#i is a combination circuit for executing the following processing operations:

(1) If signal XOACT2=ACT selected ("0"), signal XIACT=ACT selected ("1"), and signal ACTMASK=other system faulty ("0"), select result signal XOACT=ACT selected ("0").

(2) If signal XOACT2=ACT selected ("0"), select result signal XIACT=ACT selected ("0"), and signal ACTMASK=other system normal ("1"), select result signal XOACT=SBY selected ("1").

(3) In cases other than (1) and (2) above, select result signal XOACT=signal XOACT2.

Figure 11:
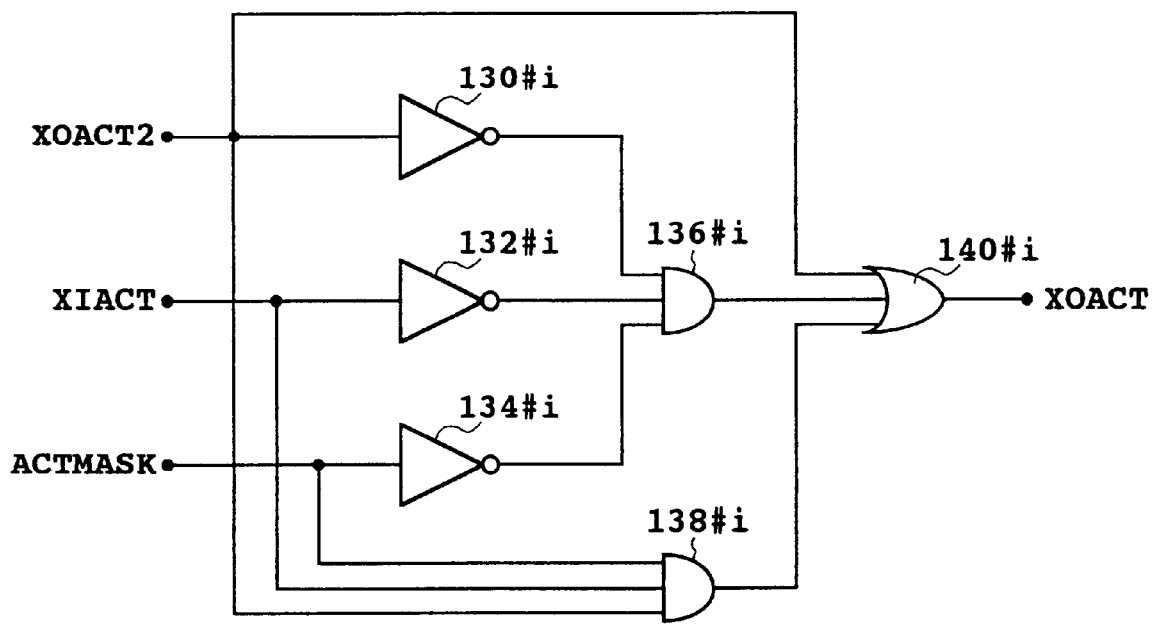
FIG. 11 is a circuit diagram illustrating the second ACT/SBY selector shown in FIG. 6.

Referring to FIG. 11, there is shown the circuit of the second ACT/SBY selector 127#i shown in FIG. 6. As shown, the second ACT/SBY selector 127#i has inverters 130#i, 132#i, and 134#i, 3-input AND gates 136#i and 138#i, and an OR gate 140#i. The inverter 130#i inverts the signal XOACT2. The inverter 132#i inverts the signal XIACT. The inverter 134#i inverts the signal ACTMASK. The AND gate 136#i performs an AND operation between the outputs of the inverters 130#i, 132#i, and 134#i. The AND gate 138#i performs and AND operation between the signals XOACT2, XIACT, and ACTMASK. The OR gate 140#i performs an OR operation between the signals XOACT2 and the output signals of the AND gates 136#i and 138#i and outputs the signal XOACT.

Figure 12:
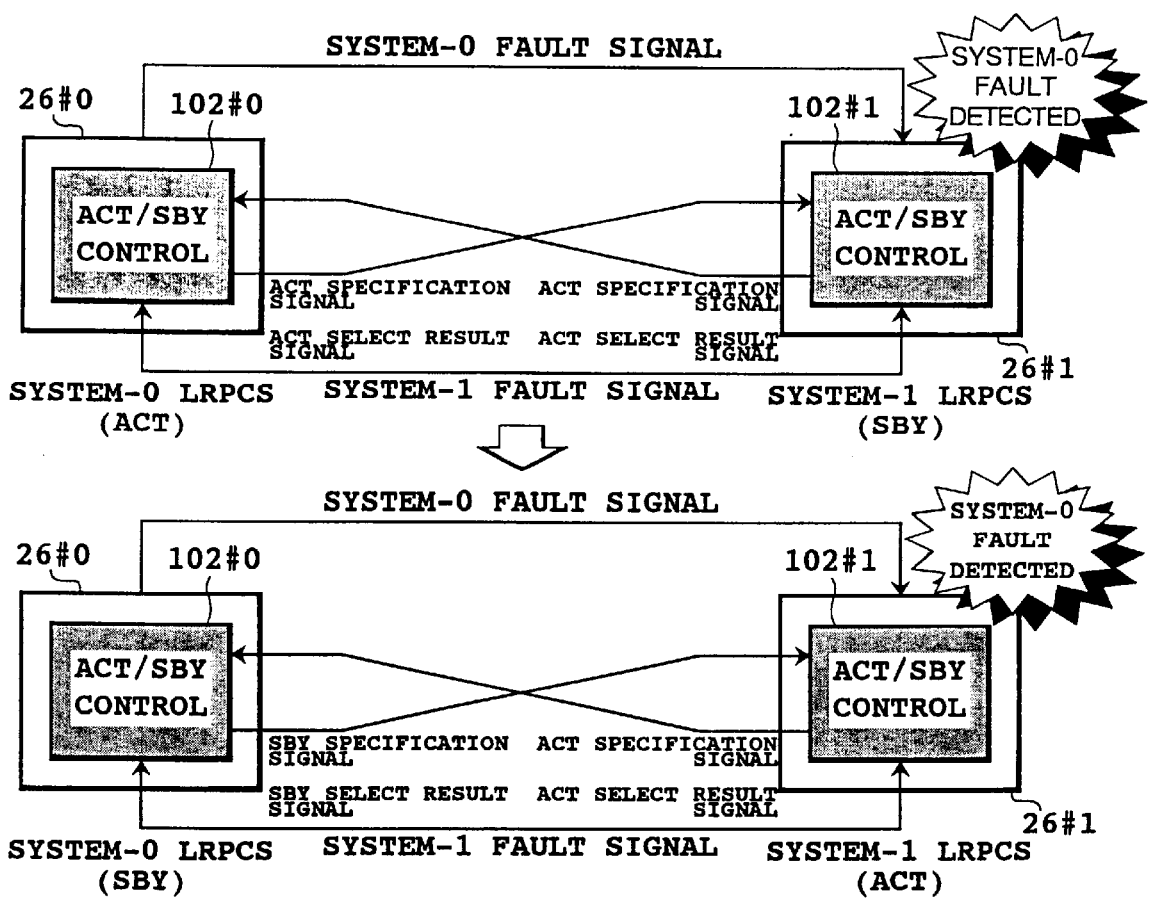
FIG. 12 is a diagram illustrating switching between ACT and SBY systems.
Figure 13:
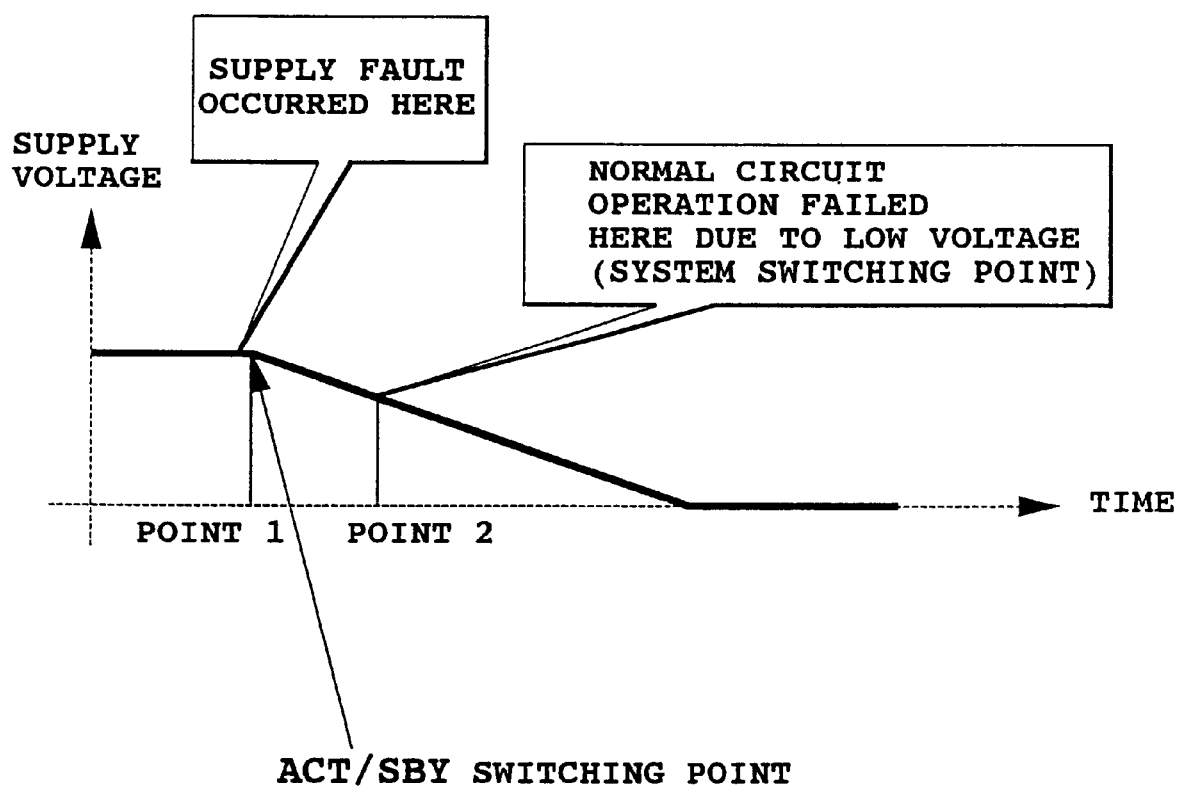
FIG. 13 is a timing chart of the switching between ACT and SBY systems.

Referring to FIG. 12, there is shown ACT/SBY switching. Referring to FIG. 13, there is shown an ACT/SBY switching timing chart. The following describes an ACT/SBY switching operation with reference to these figures.

(1) At setting up of the common blocks 70#0 and 70#1:

When setting up the common blocks 70#0 and 70#1, the CPR 60#A of the ACT system sends an ACT/SBY setting signal to the CC interface 90#i through the PSA 40#A of the ACT system, the signal for setting one of the common blocks 70#0 and 70#1 to the ACT system and the other to the SBY system. In this example, the common block 70#0 of the system 0 is set to the ACT system and the common block 70#1 of the system 1 to the SBY system. The CC interface 90#i receives the ACT/SBY specification signal from the PSA 40#A and sends the received signal to the CPU 86#i through the CPU bus 110#i. The CPU 86#i receives the ACT/SBY setting signal and writes it to the ACT setting register 111#i and, at the same time, writes a select signal for specifying setting signal selection to the ACT select register 109#i. According to the select signal held in the ACT select register 109#i, the selector 120#i in the ACT/SBY control 102#i selects the setting signal held in the ACT setting register 111#i and outputs signal XOACT1. Because none of the NOP, PAL, PD, and PKGLS faults has been encountered, the ACT/SBY mask circuit 122#i outputs signal ACTMASK="1".

Because specification signal XOACT1="1" and signal ACTMASK="1" in the initial state, the first ACT/SBY selector 124#i outputs signal XOACT2=specification signal XACTCMO=signal XOACT1. Because select result signal XIACT="1" and signal ACTMASK="1", the second ACT/SBY selector 126#i outputs select result signal XOACT=signal XOACT2 from the terminal XOACT. Consequently, the ACT/SBY control 102#0 of system 0 sends ACT specification signal XACTMO=ACT specified "0" and ACT select result signal XOACT=ACT selected "0" to the ACT/SBY control 102#1 of system 1. The ACT/SBY control 102#1 of system 1 outputs SBY specification signal XACTCMO=SBY specified "1" and SBY select result signal XOACT=SBY selected "1" to the ACT/SBY control 102#0 of system 0.

(2) When fault has been encountered in common block 70#0 of system 0:

Assume that any of the NOP, PAL, PDX, and PLS faults has been encountered in the common block 70#0 of system 0. Assume also that a NOP fault has been detected at point (1) as shown in FIG. 13. Then, NOP fault="0" is inputted from the power supply package of system 0 into the ACT/SBY control 102#1 of system 1 through a signal line. Because the input of the NOP fault="0" has been inputted, the ACT/SBY mask circuit 122#1 outputs the signal ACTMASK="0". Because the signal ACTMASK="0", the first ACT/SBY selector 124#1 sets the specification signal XACTCMO=ACT specified ("0") and the signal XOACT2=ACT specified ("0"). Because the signal XOACT2=ACT selected ("0") and the select result signal XIACT=ACT selected ("0") and ACTMASK="0", the second ACT/SBY selector 126#1 sets the select result signal XOACT=ACT selected ("0") and, at the same time, writes the select result signal XOACT="0" to the ACT/SBY instruction register 115#1. For the system 0, the ACT specification signal XACTCMO=ACT specified "0" and the ACT select result signal XOACT=ACT selected "0" as shown in the upper portion of FIG. 12. On the other hand, for the system 1, the specification signal XACTCMO=ACT specified "0" and the select result signal XOACT=ACT selected "0".

The ACT select result signal XIACT=ACT selected ("0") is inputted in the ACT/SBY control 102#0 of system 0. Because the signal XOACT2=ACT selected ("0"), the select result signal XIACT of system 1=ACT selected ("0"), and the signal ACTMASK=system 1 normal ("1"), the second ACT/SBY selector 126#0 outputs the system-0 select result signal XOACT=SBY selected ("1") and, at the same time, writes the select result signal XOACT=SBY selected "1" to the ACT/SBY instruction register 115#0. Consequently, as shown in the lower portion of FIG. 12, the system-0 LRPCS 26#0 is switched to the SBY system. On the other hand, the system-1 LRPCS 26#1 is switched to the ACT system. Thus, ACT/SBY switching is executed immediately after point (1) at which the power supply fault has been encountered as shown in FIG. 13. Because ACT/SBY switching is executed before the circuit reaches a point at which a normal operation cannot be guaranteed due to lowered voltage, a normal signal is supplied to the lower units TNGs 28#0 and 28#1 and SGCs 31#0 and so on from the LRPCS 26#1 switched to the ACT system, thereby ensuring the normal operation of these lower units even if a power supply fault for example is encountered. As described, according to the first preferred embodiment, if a power supply fault for example is encountered in the ACT system, ACT/SBY switching is executed autonomously, thereby preventing the adverse effects due to the fault from propagating to the lower units.

Second Preferred Embodiment

The present embodiment is applicable to a lower unit to which the reference clock is supplied from an upper unit and has a PLO that generates a clock which is synchronized with the supplied reference clock and has a frequency which is an integral multiple of the frequency of the supplied reference clock. The present invention is applied to the switching system shown in FIG. 3 in which the upper unit is LRPCS 26#i (i=0, 1) and the lower units are SGCs 31#i through 33#i or TNG 28#i (i=0, 1).

Figure 14:
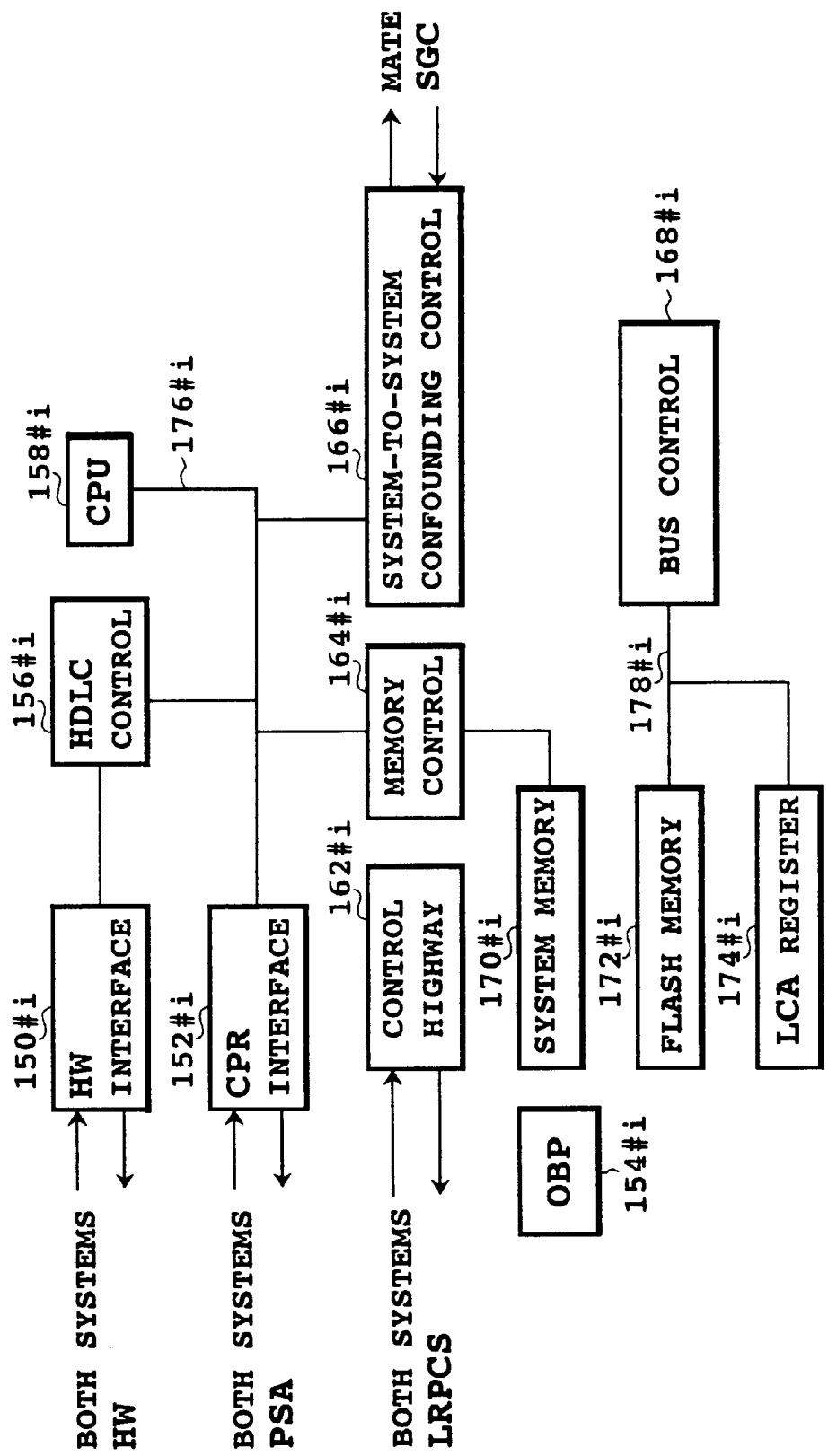
FIG. 14 is a block diagram illustrating a configuration of an SGC according to a second preferred embodiment of the invention.

Referring to FIG. 14, there is shown an SGC configuration according to the second preferred embodiment of the invention. The TNG 28#i and the SGCs 31#i through 33#i (i=0, 1) are substantially the same in the portion associated with the invention. Therefore, in this example, the SGC 31#i is used for the description of the second preferred embodiment. As shown in FIG. 14, the SGC 31#i has HW interface 150#i, CPR interface 152#i, OPB (On Board Power) 154#i, HDLC control 156#i, CPU 158#i, control highway 162#i, memory control 164#i, system-to-system confounding control 166#i, bus control 168#i, system memory 170#i, flash memory 172#i, LCA register 174#i, CPU bus 176#i, and local bus 178#i.

Figure 15:
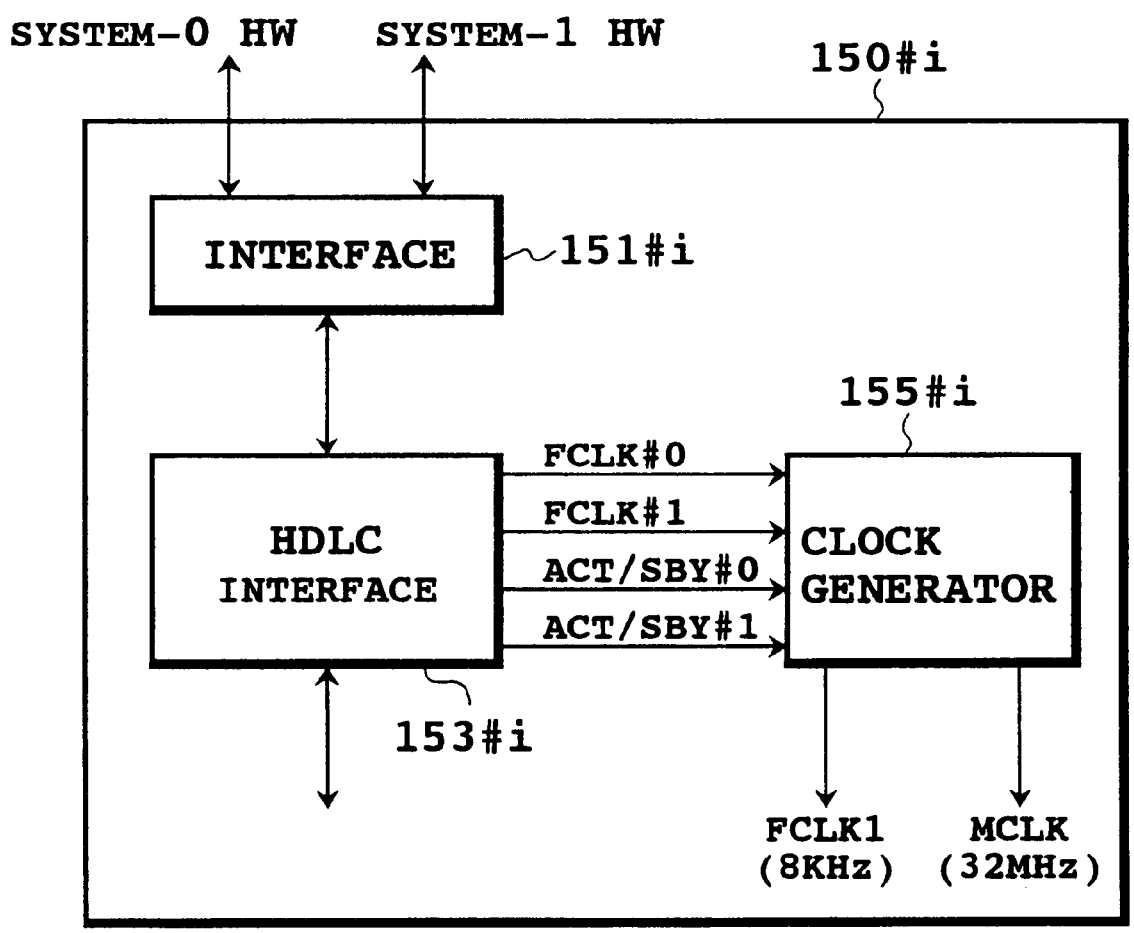
FIG. 15 is a block diagram illustrating a configuration of an HW interface shown in FIG. 14.

Referring to FIG. 15, there is shown a functional block diagram of the HW interface 150#i. As shown, the HW interface 150#i has interface 151#i, HDLC interface 153#i, and clock generator 155#i. The interface 151#i interfaces the system-0 and system-1 highways connected to the TSWs 24#0 and 24#1 shown in FIG. 2. The HDLC interface 153#i transfers HDLC data and, at the same time, separates 8-KHz reference clocks FCLK#0 and FCLK#1 and ACT/SBY specification signals ACT/SBY #0 and #1 mapped to predetermined time slots of the highways supplied from the system-0 and system-1 LRPCS 26#0 and 26#1, outputting the separated signals to the clock generator 155#i.

Figure 16:
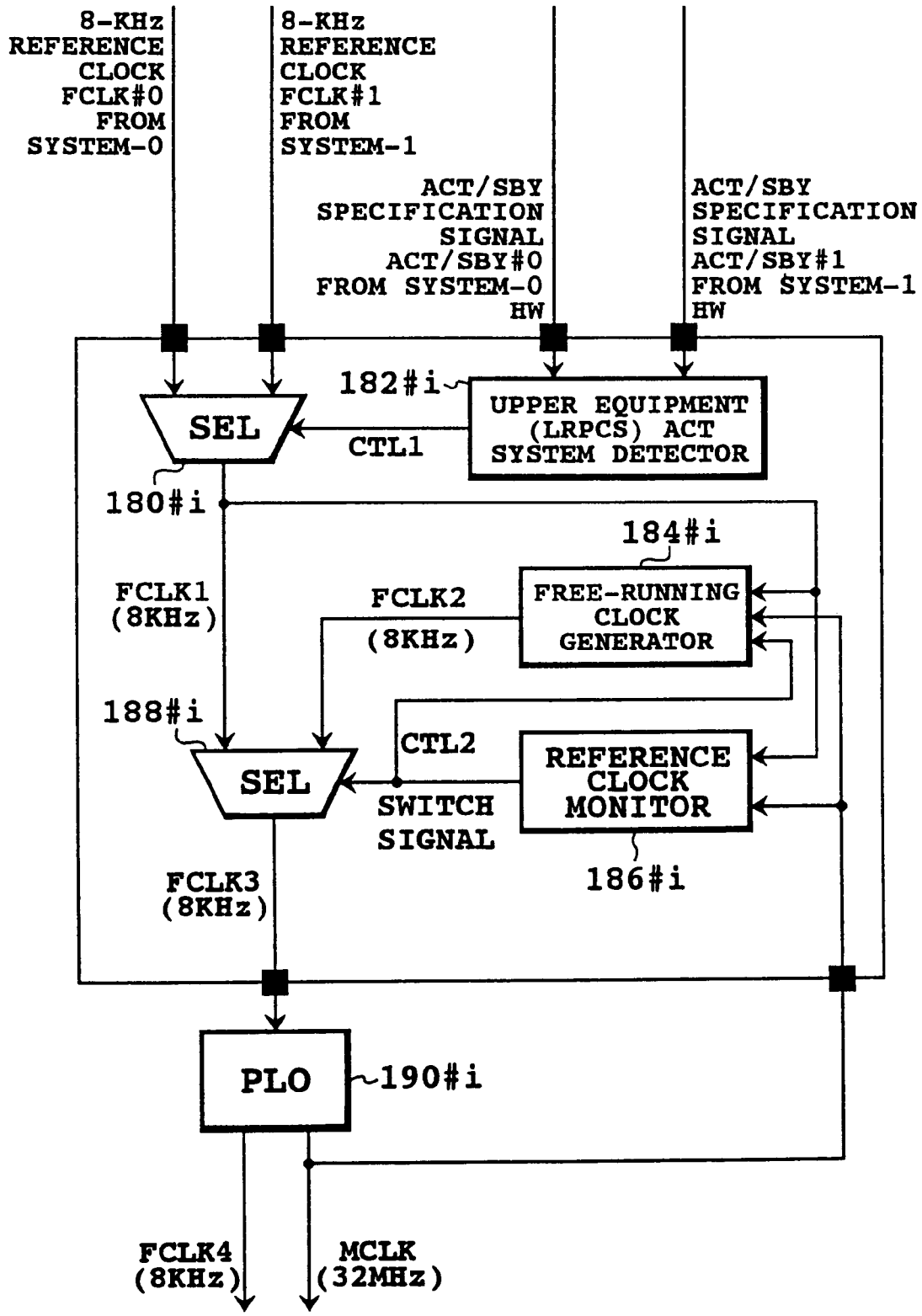
FIG. 16 is a block diagram illustrating a configuration of a clock generator shown in FIG. 15.

Referring to FIG. 16, there is shown a block diagram of the clock generator 155#i shown in FIG. 15. As shown in FIG. 16, the clock generator 155#i has SEL 180#i, ACT-system detector 182#i, free-running clock generator 184#i, reference clock monitor 186#i, SEL 188#i and PLO 190#i. According to a select signal CTL1 supplied from the ACT-system detector 182#i, the SEL 180#i selects an ACT-system clock from the system-0 and system-1 8-KHz reference clocks FCLK#0 and FCLK#1 supplied from the HDLC interface 153#i and outputs an 8-KHz reference clock FCLK1. It should be noted that the frequency of the reference clock is 8 KHz here, it will be apparent that other clock frequencies may also be used. The ACT-system detector 182#i outputs, to the SEL 180#i, the select signal CTL1 for specifying the selection of a clock for specifying the ACT system from the system-0 and system-1 ACT/SBY specification signals ACT/SBY #0 and #1 inputted from the HDLC interface 153#i.

Figure 17:
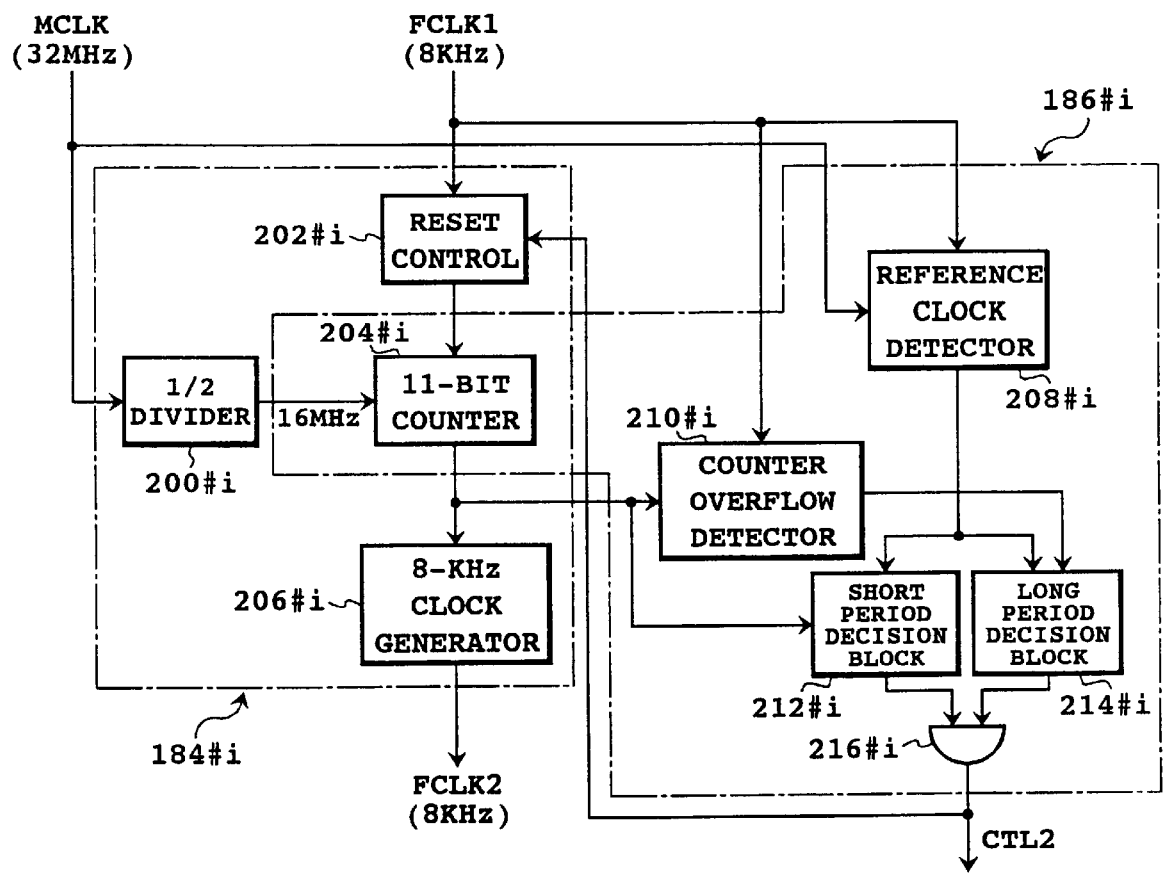
FIG. 17 is a block diagram illustrating configurations of a free-running clock generator and a reference clock monitor shown in FIG. 16.

Referring to FIG. 17, there is shown a functional block diagram of the free-running clock generator 184#i and the reference clock monitor 186#i shown in FIG. 16. As shown in FIG. 17, the free-running clock generator 184#i has 1/2 divider 200#i, reset controller 202#i, 11-bit counter 204#i, and 8-KHz clock generator 206#i. The 1/2 divider 200#i divides a 32-MHz clock MCLK into a 16-MHz clock. This division is made to make the pulse width of the free-running clock FCLK2 equal to that of the reference clock FCLK1. In this example, the pulse width of the reference clock FCLK1 is 16 MHz. The reset controller 202#i negates a reset signal if the switch signal CTL2 specifies the selection of the free-running clock FCLK2. If the switch signal CTL2 specifies the selection of the reference clock FCLK1, the reset controller 202#i delays the transition of the reference clock FCLK1 to "0" by a certain time and latches the pulse of the transition to "0" at the rise of the clock MCLK for example, asserting the reset signal. This assertion is made to prevent the 11-bit counter 204#i from being reset during a certain time from the transition of the reference clock FCLK1 to "0" to the selection by the switch signal CTL2 of the free-running clock FCLK2 when the period of the reference clock FCLK1 is shorter than 8 KHz.

The 11-bit counter 198#i is reset when the reset signal inputted in reset terminal RESET is asserted, counting 0 through 2047 according to the 16-MHz clock inputted in clock terminal CLK. In this example, the free-running clock generator 184#i and the reference clock monitor 186#i share the 11-bit counter 198#i, thereby preventing the circuit scale from being increased. The 8-KHz clock generator 206#i decodes the output of the 11-bit counter 204#i to output a pulse ("0") of 16-MHz period with at the clock that follows count 2047. The reference clock monitor 186#i has 11-bit counter 204#i, reference clock detector 208#i, counter overflow detector 210#i, short period decision block 212#i, long period decision block 214#i, and output circuit 216#i. The reference clock detector 208#i latches the pulse ("0") of the reference clock FCLK1 at the rise of the clock MCLK.

The counter overflow detector 210#i negates an overflow detection signal according to the pulse ("0") of the reference clock FCLK1 and asserts the overflow detection signal when the count value of the 11-bit counter 204#i goes from count value 2047 to 0. Thus, if the reference clock FCLK1 is normal, the overflow detection signal is negated upon overflow detection, so that the overflow detection signal is asserted when the period of the reference clock is longer than 8 KHz (including a time when the clock is interrupted). The short period decision block 212#i outputs a signal indicative of an short period error because the period of the reference clock FCLK1 is shorter than 8 KHz if the output of the 11-bit counter 204#i is other than 0 when the pulse outputted from the reference clock detector 208#i is valid. The long period decision block 214#i outputs a signal indicative of a long period error because the period of the reference clock FCLK1 is longer than 8 KHz or off when the counter overflow detector 210#i is asserting the overflow detection signal.

The output circuit 216#i outputs the switch signal CTL2 for specifying the selection of the free-running clock FCLK2 if the output signals of the short period decision block 212#i and the long period decision block 214#i indicate a period error, in the other case, the output circuit 216#i outputs the switch signal CTL2 for specifying the selection of the reference clock FCLK1. The PLO 190#i shown in FIG. 16 has a voltage-controlled oscillator, a 1/4096 divider, a phase comparator, and a lowpass filter. The PLO 190#i outputs a 32 MHz clock MCLK synchronized with the phase of the reference clock FCLK1 and an 8-KHz clock FCLK obtained by dividing the clock MCLK by 4096 and, if out-of-synchronization occurs, outputs an alarm. The CPR interface 152#i shown in FIG. 14 performs communication control under the control of the CPRs 60#0 and 60#1 shown in FIG. 3 and has a capability of data transfer between PAC interface and CPU bus 176#i. The OBP 154#i converts the main power supply (−48V) into operating voltages (5V and 3.3V) in the SGC 31#i. The HDLC control 156#i resolves the HDLC received from the HW interface 150#i and develops the resolved HDLC into the system memory 170#i. The HDLC control 156#i also converts data supplied from the CPR interface 152#i into HDLC.

The CPU 158#i controls the SGC 31#i in its entirety. The control highway 162#i has a capability of data transfer for the device control by the CPR 60#i through the LRPCSs 26#0 and 26#1 and a capability of DMA control. The memory control 164#i interfaces the CPU 158#i to control the system memory 170#i. The system-to-system confounding control 166#i executes dual control and provides a system-to-system memory copy capability and a system-to-system communication capability. The bus control 168#i executes bus arbitration on the CPU bus 176#i and the local bus 178#i and controls the flash memory 172#i. The system memory 170#i is an SDRAM for example for executing LAPD communication between the DLCCs 66#0 and 66#1. The flash memory 172#i is a non-volatile memory. The LCA register 174#i holds various pieces of control information. The CPU bus 176#i provides connection between the CPU 158#i and other LSIs. The local bus 178#i provides connection between the bus control 168#i and the flash memory 172#i and the LCA register 174#i.

The following describes the operation of the SCG 31#i shown in FIG. 14. The LRPCSs 26#0 and 26#1 map the 8-KHz reference clocks FCLK#0 and FCLK#1 and the ACT/SBY specification signals ACT/SBY#0 and ACT/SBY#1 onto highway time slots to send these signals to SGC 31#i through the TSWs 24#0 and 24#1. The interface 151#i shown in FIG. 15 interfaces the highway to extract each time slot and outputs the extracted signals to the HDLC interface 153#i. The HDLC interface 150#i outputs the reference clocks FCLK#0 and FCLK#1 and the ACT/SBY specification signal ACT/SBY#0 and ACT/SBY#1 to the clock generator 155#i.

The following describes the operation of the clock generator 155#i.

(1) If reference clock FLK1 is normal:

The ACT-system detector 182#i shown in FIG. 16 outputs a select signal CTL1 for specifying an ACT-system reference clock from the system-0 and system-1 ACT/SBY specification signals ACT/SBY#0 and ACT/SBY#1. According to the select signal CTL1, the SEL 180#i selects the ACT system from the reference clocks FLK#0 and FLK#1 and outputs 8-KHz reference clock FCLK1. As will be described, if the reference clock FCLK1 is normal, the reference clock monitor 186#i outputs a switch signal CTL2 for specifying the selection of the reference clock FCLK1. According to the switch signal CTL2, the SEL 188#i selects the reference clock FCLK1 and outputs a clock FCLK3 to the PLO 190#i. The PLO 190#i phase-synchronizes with the 8-KHz clock FCLK3 to generate a 32-MHz clock MCLK and an 8-KHz clock FCLK4. At this moment, the phase of the 8-KHz clock FCLK4 matches the phase of the reference clock FCLK1. The reference clock detector 208#i shown in FIG. 17 detects the 32-MHz clock MCLK according to the pulse ("0") of the reference clock FCLK1 and outputs the detected pulse (having the width of 32-MHz period). According to the reset signal outputted from the reset controller 202#i, the 11-bit counter 204#i is reset if the reference clock FCLK1 is normal.

According to the 16-MHz clock, the 11-bit counter 204#i repeatedly counts 0 through 2047 to output an 11-bit count value. The 8-KHz clock generator 206#i decodes the count value supplied from the 11-bit counter 204#i and outputs pulses ("0") only for a period in which the count value is 0, thereby outputting an 8-KHz free-running clock FCLK2. Because the reference clock FCLK1 is normal, the 11-bit counter 204#i is reset according to the pulse of the reference clock FCLK1, the phase of the reference clock FCLK1 matches the phase of the free-running clock FCLK2. Because the reference clock FCLK1 is normal and therefore the overflow timing of the count output of the 11-bit counter 204#i matches the timing of its detection pulse, the counter overflow detector 210#i negates an overflow detection signal. Because the detection pulse of the reference clock FCLK1 matches the output timing of count value="0" of the 11-bit counter 204#i, the short period decision block 212#i outputs a signal indicative of no short period error. Because the overflow detection signal has been negated, the long period decision block 214#i outputs a signal indicative of no long period error. Because there is neither the short period error nor long period error, the output circuit 216#i outputs a switch signal CTL2 for specifying the selection of the reference clock FCLK1.

(2) If the period of reference clock FCLK1 is short:

The reference clock detector 208#i shown in FIG. 17 outputs a detection pulse (having a width of 32 MHz period). According to the reset signal outputted from the reset controller 202#i, the 11-bit counter 204#i is reset when the reference clock FCLK1 is normal. According to the 16-MHz clock, the 11-bit counter 204#i repeatedly counts 0 through 2047 and outputs an 11-bit count value. Because the period of the reference clock FCLK1 is shorter than 8 KHz and the count value of the 11-bit counter 204#i is not "0" during a period in which the detection pulse ("0") is outputted, the short period decision block 212#i outputs a signal indicative of a short period error. Because the short period error has been detected, the output circuit 216#i outputs a switch signal CTL2 for specifying the selection of the free-running clock FCLK2. The reset controller 202#i negates the reset signal until the switch signal CTL2 specifies the selection of the free-running clock FCLK2 after transition of the reference clock FCLK1 to "0". When the switch signal CTL2 specifies the selection of the free-running clock FCLK2, the reset signal is negated. Consequently, if the reference clock FCLK1 is not normal, the 11-bit counter 204#i is not reset by the reset signal.

If the reference clock FCLK1 is abnormal, the 11-bit counter 204#i repeatedly counts 0 through 2047 according to the clock. The 8-KHz clock generator 206#i decodes the count value of the 11-bit counter 204#i and continues the phase in which the reference clock FCLK1 is normal, outputting the 8-KHz free-running clock FCLK2 having normal period. When the period of the reference clock FCLK1 is found short, the switch signal CTL2 specifies the selection of the free-running clock FCLK2, so that the selector 188#i selects the free-running clock FCLK2. At this moment, upon detection of the abnormal reference clock FCLK1, switching is made to the free-running clock FCL2. The PLO 190#i phase-synchronizes the clock FCLK2 and outputs a 32-MHz clock MCLK and an 8-KHz clock FCLK. At this moment, switching is instantly made to the 8-KHz free-running clock FCLK2 having normal period, so that no out-of-synchronization occurs in the PLO 190#i.

(3) When the period of reference clock FCLK1 is long:

The reference clock detector 208#i shown in FIG. 17 outputs a detection pulse (having width of 32-MHz period). According to the reset signal outputted from the reset controller 202#i, the 11-bit counter 204#i is reset when the reference clock FCLK1 is normal. According to the 16-MHz clock, the 11-bit counter 204#i repeatedly counts 0 through 2047 and outputs an 11-bit count value. Because the period of the reference clock FCLK1 is longer than 8 KHz, the counter overflow detector 210#i asserts the overflow detection signal. When the overflow detection signal is asserted, the long period decision block 214#i outputs a signal indicative of a long period error. Because a long period error has been detected, the output circuit 216#i outputs a switch signal CTL2 for specifying the selection of the free-running clock FCLK2.

When the switch signal CTL2 specifies the selection of the free-running clock FCLK2, the reset controller 202#i negates the reset signal. Consequently, if the reference clock FCLK1 is not normal, the 11-bit counter 204#i is not reset by the reset signal. If the reference clock FCLK1 is abnormal, the 11-bit counter 204#i repeatedly counts 0 through 2047 according to the clock. The 8-KHz clock generator 206#i decodes the count value outputted from the 11-bit counter 204#i and continues the phase in which the reference clock FCLK1 is normal, outputting the 8-KHz free-running clock FCLK2 having normal period. When the period of the reference clock FCLK1 is found long, the switch signal CTL2 specifies the selection of the free-running clock FCLK2, so that the selector 188#i selects the free-running clock FCLK2. At this moment, upon detection of the abnormal reference clock FCLK1, switching is made to the free-running clock FCL2. The PLO 190#i phase-synchronizes the clock FCLK2 and outputs a 32-MHz clock MCLK and an 8-KHz clock FCLK. At this moment, switching is instantly made to the 8-KHz free-running clock FCLK2 having normal period, so that no out-of-synchronization occurs in the PLO 190#i.

(4) If the reference clock FCLK1 is off, the same operation as that described in (3) above takes place.

(5) When ACT/SBY switching is made:

When switching is made between the ACT and SBY systems and the normal reference clock FCLK1 is outputted from the selector 180#i, the reference clock monitor 186#i outputs the switch signal CTL2 for specifying the selection of the reference clock FCLK1. The selector 188#i selects the reference clock FCLK1. The PLO 190#i outputs the 32-MHz clock MCLK and the 8-KHz clock FCLK phase-synchronized with the reference clock FCLK1. As described, according to the second preferred embodiment, even if the clock supplied from an upper unit is abnormal, the PLO operates on the basis of the free-running clock, so that out-of-synchronization in the PLO can be avoided.

Thus, according to the invention, if a power supply fault for example takes place in the ACT system of an upper dual apparatus, switching between the ACT and SBY systems is made autonomously, thereby preventing the adverse effects due to the fault from propagating to lower units. In addition, even if the clock supplied from an upper unit is abnormal, the PLO operates on the basis of the free-running clock, thereby preventing out-of-synchronization from taking place in the PLO.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A dual apparatus having a first unit and a second unit having a same configuration, one being operated in an active state and the other in a standby state, each of said first unit and said second unit comprising:

a first signal line in which a specification signal indicative of one of said active state and said standby state specified by an upper unit is inputted;

a second signal line in which fault information about a predetermined fault in the other unit is inputted;

a third signal line from which a signal is outputted to the other unit, said signal being either said active state or said standby state; a fourth signal line in which a signal is inputted from the other unit, said signal being either said active state or said standby state; a first selector for selecting one of a first active state and a first standby state on the basis of said specification signal and said fault information and, if said fault information inputted in said second signal line indicates said predetermined fault in the other unit, selecting said first active state;

a second selector for, if said signal inputted from said fourth signal line is said active state and said state selected by said first selector of a current unit is said first active state and said fault information indicates said predetermined fault in the other unit, setting said current unit to said active state and outputting the selected state to said third signal line and, if said state selected by said first selector is said first active state and said fault information does not indicate said predetermined fault in the other unit, setting said current unit to said standby state and outputting the set state to said third signal line; and a register for holding said state selected by said second selector;

wherein said first unit and said second unit switch between said active state and said standby state on the basis of said state held in said register.

2. A dual apparatus according to claim 1, wherein said first unit and said second unit each further comprises a block for a specification signal indicative of which of said active state or said standby state said current unit is in to a same lower unit on the basis of said state held in said register.

3. A dual apparatus according to claim 1, wherein said predetermined fault is a fault in a power supply to be supplied to the other unit.

4. A dual apparatus according to claim 1, wherein said first selector selects one of said first active state and said first standby state on the basis of a specification signal by an upper unit and said second selector sets the current unit to said standby state if said first selector of the current unit selects said first standby state and a state indicated by information supplied from the other unit is said active state and sends information indicative of the setting of the current unit to said standby state.

5. A dual apparatus according to claim 4, wherein said second selector sets the current unit to said active state, if said predetermined fault takes place in the other unit and said first selector of the current unit selects the first active state and a state indicated by information supplied from the other unit is said active state and sends information indicative of the setting of the current unit to said active state.

6. A dual apparatus according to claim 1, wherein said second selector sets the current unit to said standby state if said first selector of the current unit selects said first standby state and said signal inputted from said fourth signal line is said active state and outputs the set state to said third signal line.

7. A dual apparatus according to claim 6, wherein said second selector sets the current unit to said active state, if said predetermined fault takes place in the other unit and said first selector of the current unit selects the first active state and said signal inputted from said fourth signal line is said active state and outputs the set state to said third signal line.

8. A highway interface circuit for generating a first clock on the basis of a reference clock supplied from a highway, comprising:

a selector for selecting one of said reference clock and a free-running clock on the basis of a switch signal to output a second clock;

a phase-locked oscillator, synchronized with said second clock, for generating said first clock having a frequency which is an integral multiple of a frequency of said second clock;

a free-running clock generator, reset on the basis of said switch signal and said reference clock, for executing a counting operation on the basis of said first clock to generate said free-running clock having the same frequency as that of said reference clock; and a reference clock monitor for executing a counting operation on the basis of said first clock to generate said switch signal indicative of abnormalcy in said reference clock.

9. A highway interface circuit for generating a first clock on the basis of a first specification signal and a second specification signal indicative of one of an active state and a standby state mapped from a first highway and a second highway into a predetermined first time slot and a first reference clock and a second reference clock mapped from a third highway and a fourth highway corresponding to said first highway and said second highway respectively into a predetermined second time slot, said highway interface circuit comprising:

- a first selector for selecting a clock, as a reference clock, indicative of said active state from said first reference clock and said second reference clock on the basis of said first specification signal and said second specification signal;
- a second selector for selecting one of said reference clock and a free-running clock on the basis of a switch signal to output a second clock;
- a phase-locked oscillator, synchronized with said second clock, for generating said first clock having a frequency which is an integral multiple of a frequency of said second clock;
- a free-running clock generator, reset on the basis of said switch signal and said reference clock, for executing a counting operation on the basis of said first clock to generate said free-running clock having a same frequency as that of said reference clock; and
- a reference clock monitor for executing a counting operation on the basis of said first clock to generate said switch signal indicative of abnormalcy in said reference clock.

10. A highway interface circuit according to claim 9, wherein said reference clock monitor comprises:

- a counter, reset on the basis of a pulse of said reference clock, for executing a counting operation on the basis of said first clock;
- a counter overflow detector, cleared on the basis of said pulse, for detecting an overflow of said counter;
- a first decision block for determining a first clock abnormalcy in which a period of said reference clock is relatively short on the basis of a count value of said counter and said reference clock;
- a second decision block for determining a second clock abnormalcy in which the period of said reference clock is relatively long on the basis of a result of the detection by said counter overflow detector and said reference clock; and
- an output block, if any of said first decision block and said second decision block determines said first clock abnormalcy and said second clock abnormalcy respectively, for outputting a said switch signal for specifying switching to said free-running clock.

11. A highway interface circuit according to claim 9, wherein said free-running clock generator comprises:

- a reset controller for controlling the reset on the basis of said reference clock and said switch signal; and
- a counter, reset by said reset controller, for executing a counting operation on the basis of said first clock to output a pulse as said free-running clock at a predetermined count value.

* * * * *